United States Patent
Bachot et al.

(10) Patent No.: US 7,035,985 B2
(45) Date of Patent: *Apr. 25, 2006

(54) METHOD AND APPARATUS FOR ACCESSING A MEMORY CORE MULTIPLE TIMES IN A SINGLE CLOCK CYCLE

(75) Inventors: Jean-Marc Bachot, Placassier (FR); Eric Badi, Cagnes sur Mer (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/664,541

(22) Filed: Sep. 19, 2003

(65) Prior Publication Data

US 2004/0109381 A1 Jun. 10, 2004

Related U.S. Application Data

(63) Continuation of application No. 09/410,772, filed on Oct. 1, 1999, now Pat. No. 6,629,223.

(30) Foreign Application Priority Data

| Oct. 6, 1998 | (EP) | ................................ 98402455 |
| Feb. 26, 1999 | (EP) | ................................ 99400472 |

(51) Int. Cl.
*G06F 13/16* (2006.01)

(52) U.S. Cl. .................... 711/167; 711/104; 711/105; 711/169; 365/230.02; 365/230.05; 365/233

(58) Field of Classification Search ................ 711/167, 711/104, 105, 169; 365/230.02, 230.05, 365/233
See application file for complete search history.

(56) References Cited

U.S. PATENT DOCUMENTS

| 4,894,557 | A | * | 1/1990 | Beltramini | .................. 327/217 |
| 5,396,608 | A | * | 3/1995 | Garde | ........................ 711/200 |
| 5,414,751 | A | | 5/1995 | Yamada | |
| 5,471,607 | A | | 11/1995 | Garde | |
| 5,612,923 | A | * | 3/1997 | Gibson et al. | ......... 365/230.05 |
| 5,685,005 | A | * | 11/1997 | Garde et al. | .................. 712/36 |
| 5,699,530 | A | | 12/1997 | Rust et al. | |
| 5,708,850 | A | | 1/1998 | Staros | |
| 5,765,218 | A | | 6/1998 | Ozawa et al. | |
| 5,781,480 | A | | 7/1998 | Nogle et al. | |
| 5,790,443 | A | | 8/1998 | Shen et al. | |
| 5,831,926 | A | * | 11/1998 | Norris et al. | .......... 365/230.04 |
| 5,896,543 | A | | 4/1999 | Garde | |
| 5,923,615 | A | | 7/1999 | Leach et al. | |
| 5,973,955 | A | | 10/1999 | Nogle et al. | |
| 5,999,482 | A | * | 12/1999 | Kornachuk et al. | ......... 365/233 |
| 6,078,527 | A | | 6/2000 | Roth et al. | |
| 6,629,223 | B1 | * | 9/2003 | Bachot et al. | .............. 711/167 |

FOREIGN PATENT DOCUMENTS

EP 1 031 988 A1 8/2000

OTHER PUBLICATIONS

"An Enhanced 16K E²PROM", Lubin Gee, et al., IEEE Journal of Solid-State Circuits, vol. SC-17, No. 5, Oct. 1982, pp. 828-832.

"Considerations for Selecting A DSP Processor (ADSP-2101 vs. TMS320C50)", B. Fine, et al., Microprocessors and Microsystems, vol. 18, No. 6, Jul. 1994, pp. 351-362, XP000460483.

"Control Logic and Cell Design for a 4K NVRAM", Douglas J. Lee, et al., IEEE Journal of Solid-State Circuits, vol. SC-18, No. 5, Oct. 1983, pp. 525-532.

"The Motorola DSP56000 Digital Signal Processor", Kevin L. Kloker, IEEE Micro, vol. 6, No. 6, Dec. 1986, pp. 29-48, XP000211994.

\* cited by examiner

*Primary Examiner*—Stephen C. Elmore
(74) *Attorney, Agent, or Firm*—Ronald O. Neerings; Wade James Brady, III; Frederick J. Telecky, Jr.

(57) ABSTRACT

An apparatus and method for using self-timing logic to make at least two accesses to a memory core in one clock cycle is disclosed. In one embodiment of the invention, a memory wrapper (28) incorporating self-timing logic (36) and a mux (32) is used to couple a single access memory core (30) to a memory interface unit (10). The memory interface unit (10) couples a central processing unit (12) to the memory wrapper (28). The self-timing architecture as applied to multi-access memory wrappers avoids the need for calibration. Moreover, the self-timing architecture provides for a full dissociation between the environment (what is clocked on the system clock) and the access to the core. A beneifical result of the invention is making access at the speed of the core while processing several access in one system clock cycle. In accordance with another aspect of the invention, the apparatus and method for using self-timing logic to make at least two accesses to a memory core in one clock cycle is incorporated into a data processing system, such as a digital signal processor (DSP) (40). In another embodiment of the invention, a memory core (26 embodied within RAM 206) incorporating the self-timing architecture is incorporated directly into the processor core thereby avoiding the need for a memory wrapper and the time delay associated with passing information from the processor core via the memory interface unit and to the memory core. Direct incorporation of a memory core into the processor core facilitates more intensive accessing and additional power savings. In accordance with yet another aspect of the invention, the apparatus and method for using self-timing logic to make at least two accesses to a memory core in one clock cycle is incorporated into a data processing system, such as a digital signal processor (DSP) (40, 190) is further incorporated into an electronic computing system, such as a digital cellular telephone handset (226).

45 Claims, 10 Drawing Sheets

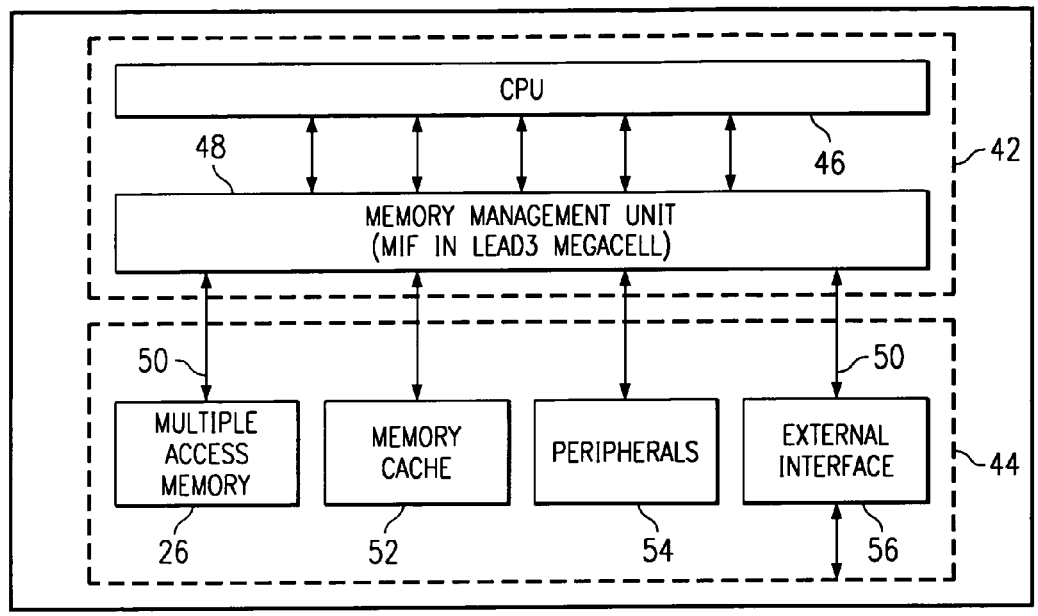
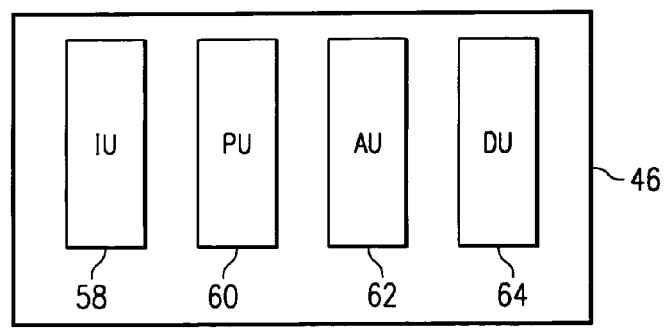

FIG. 13
| | $t_1$ | $t_2$ | $t_3$ | $t_4$ | $t_5$ | $t_6$ | $t_7$ | $t_8$ | $t_9$ | $t_{10}$ | $t_{11}$ |
|---|---|---|---|---|---|---|---|---|---|---|---|
| 152 — INST 1 | $PF_1$ | $F_1$ | $D_1$ | $AD_1$ | $AC_1$ | $R_1$ | $E_1$ | | | | |
| 154 — INST 2 | | $PF_2$ | $F_2$ | $D_2$ | $AD_2$ | $AC_2$ | $R_2$ | $E_2$ | | | |
| 156 — INST 3 | | | $PF_3$ | $F_3$ | $D_3$ | $AD_3$ | $AC_3$ | $R_3$ | $E_3$ | | |
| 158 — INST 4 | | | | $PF_4$ | $F_4$ | $D_4$ | $AD_4$ | $AC_4$ | $R_4$ | | |
| 160 — INST 5 | | | | | $PF_5$ | $F_5$ | $D_4$ | $AD_5$ | $AC_5$ | $R_5$ | |
| 162 — INST 6 | | | | | | $PF_6$ | $F_6$ | $D_4$ | $AD_6$ | $AC_6$ | $R_6$ |
| 164 — INST 7 | | | | | | | $PF_7$ | $F_7$ | $D_4$ | $AD_7$ | $AC_7$ |
(Labels above table: 134, 138, 140, 142, 144, 148, 150)
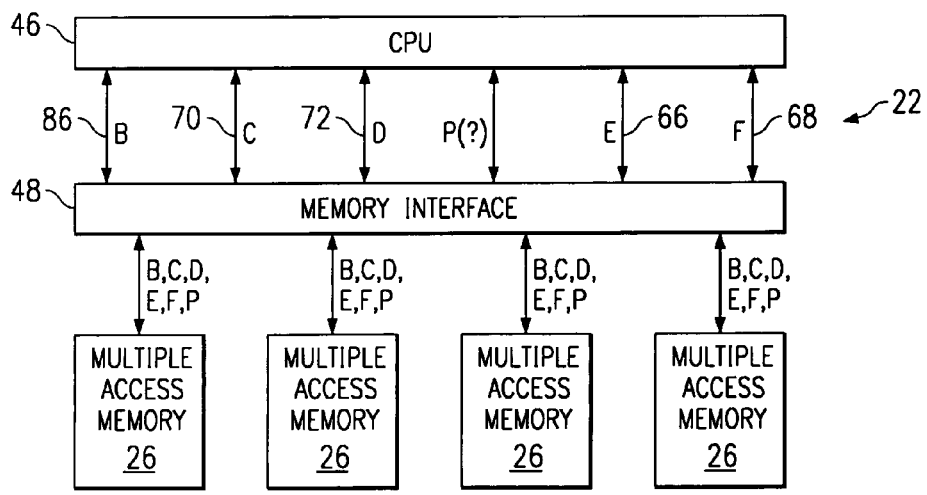
FIG. 15
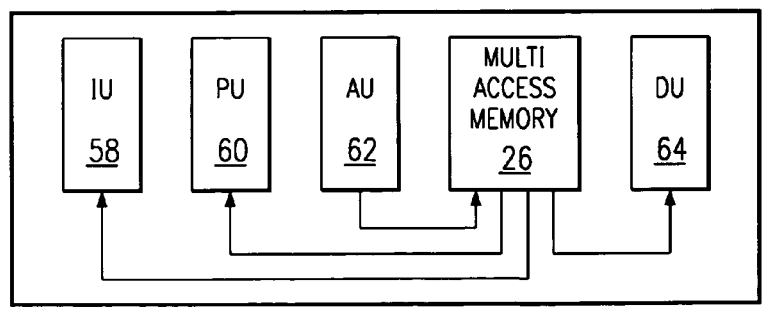
FIG. 16

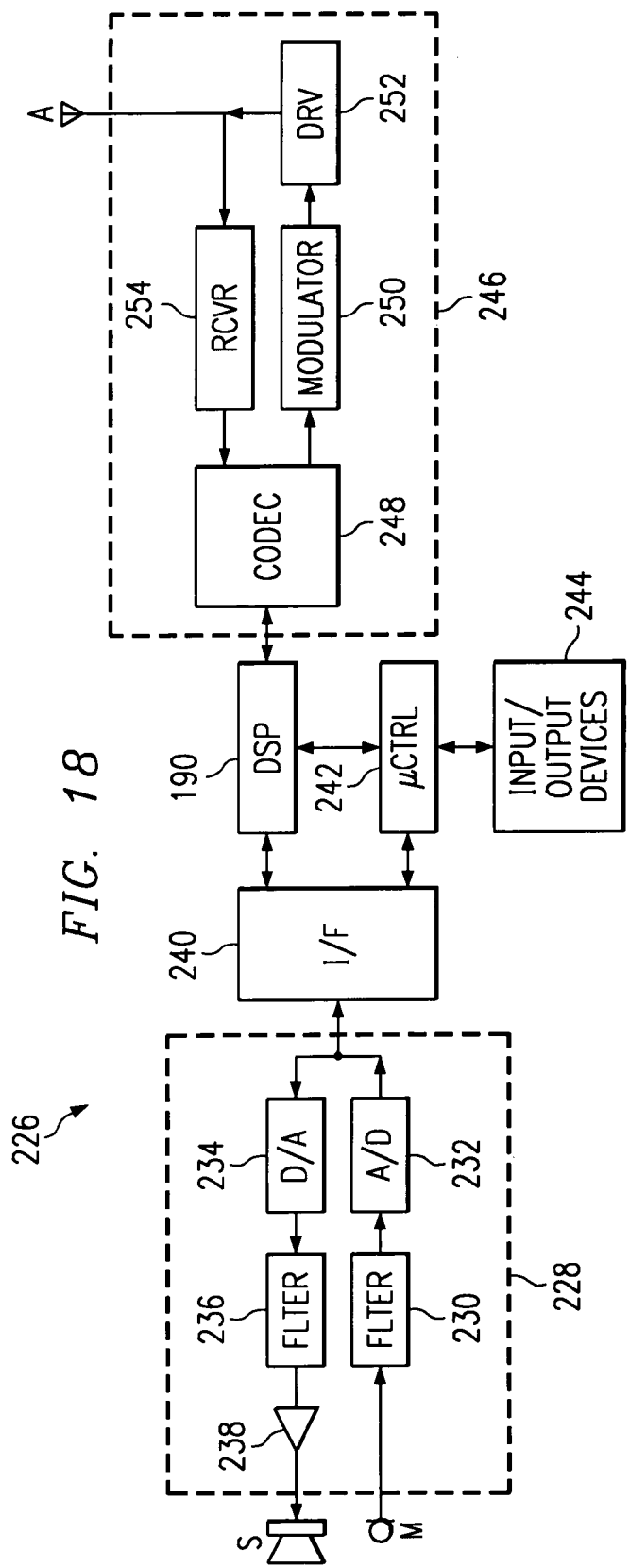

METHOD AND APPARATUS FOR ACCESSING A MEMORY CORE MULTIPLE TIMES IN A SINGLE CLOCK CYCLE

This application is a Continuation of application Ser. No. 09/410,772, Oct. 1, 1999, Now U.S. Pat. No. 6,629,223, which claims priority to S.N. 99400472.9, filed in Europe on Feb. 26, 1999 (TI-27700EU) and S.N. 98402455.4, filed in Europe on Oct. 6, 1998 (TI-28433EU).

FIELD OF THE INVENTION

The present invention relates to the field of digital signal processors and signal processing systems and, in particular, to a method and apparatus for accessing a memory core multiple time in a single clock cycle.

BACKGROUND OF THE INVENTION

Signal processing generally refers to the performance of real-time operations on a data stream. Accordingly, typical signal processing applications include or occur in telecommunications, image processing, speech processing and generation, spectrum analysis and audio processing and filtering. In each of these applications, the data stream is generally continuous. Thus, the signal processor must produce results, "through-put", at the maximum rate of the data stream.

Conventionally, both analog and digital systems have been utilized to perform many signal processing functions. Analog signal processors, though typically capable of supporting higher through-put rates, are generally limited in terms of their long term accuracy and the complexity of the functions that they can perform. In addition, analog signal processing systems are typically quite inflexible once constructed and, therefore, best suited only to singular application anticipated in their initial design.

A digital signal processor provides the opportunity for enhanced accuracy and flexibility in the performance of operations that are very difficult, if not impracticably complex, to perform in an analog system. Additionally, digital signal processor systems typically offer a greater degree of post-construction flexibility than their analog counterparts, thereby permitting more functionally extensive modifications to be made for subsequent utilization in a wider variety of applications. Consequently, digital signal processing is preferred in many applications.

Within a digital signal processor, a memory wrapper is an interface between a memory core and a sea of gates. A combination of a memory core and a memory wrapper can be considered a memory module. In FIG. 1, a memory interface (10) couples a CPU (12) to a single access memory module (14). Memory module (14) comprises a single bus (16) coupling a single access memory core (18) to a memory wrapper (20). Multiple buses (22) couple memory wrapper (20) to memory interface (10). In a single access memory module, such as memory module (14), only one access is performed in one cycle. In this embodiment, a system clock typically serves as the strobe of the memory core and the memory wrapper serves solely as a bus arbitrator that allows a CPU to perform a single access to the memory core in one cycle.

SUMMARY OF THE INVENTION

In accordance with a first aspect of the invention, there is provided an apparatus and method for using self-timing logic to make at least two accesses to a memory core in one clock cycle. In one embodiment of the invention, a memory wrapper incorporating self-timing logic and a mux(es) is used to couple a multiple access memory core to a memory interface unit. The memory interface unit couples a central processing unit to the memory wrapper. The self-timing architecture as applied to multi-access memory wrappers avoids the need for calibration. Moreover, the self-timing architecture provides for a full dissociation between the environment (what is clocked on the system clock) and the access to the core. A beneifical result of the invention is making access at the speed of the core while processing several access in one system clock cycle.

In another embodiment of the invention, a memory core incorporating the self-timing architecture is incorporated directly into the processor core thereby avoiding the need for a memory wrapper and the time delay associated with passing information from the processor core via the memory interface unit and to the memory core. Direct incorporation of a memory core into the processor core facilitates more intensive accessing and additional power savings.

In accordance with a second aspect of the invention, the apparatus and method for using self-timing logic to make at least two accesses to a memory core in one clock cycle is incorporated into a data processing system, such as a digital signal processor (DSP).

In accordance with a third aspect of the invention, the apparatus and method for using self-timing logic to make at least two accesses to a memory core in one clock cycle is incorporated into a data processing system, such as a digital signal processor (DSP) is further incorporated into an electronic computing system, such as a digital cellular telephone handset.

BRIEF DESCRIPTION OF THE DRAWINGS

For a more complete understanding of the present invention and for further advantages thereof, reference is now made to the following detailed description in conjunction with the drawings in which:

FIG. 9 is a schematic block diagram of a processor in accordance with an embodiment of the invention.

FIG. 10 is a schematic block diagram illustrating how the four main elements of the core processor of FIG. 9 are coupled to multiple access memory 26.

FIG. 13 is a diagrammatic illustration of the pipeline stages for the core processor of FIG. 10.

FIG. 15 illustrates a technique for coupling multiple access memory 26 to memory interface unit 48.

FIG. 16 illustrates an optional embodiment of a processor core in which multiple access memory 26 is incorporated into the processor core.

FIG. 18 is a schematic illustration of an exemplary battery powered computing system, implemented as a wireless telephone, including the DSP of FIG. 15, according to a preferred embodiment of the invention.

DESCRIPTION OF PARTICULAR EMBODIMENTS

Figure 1:
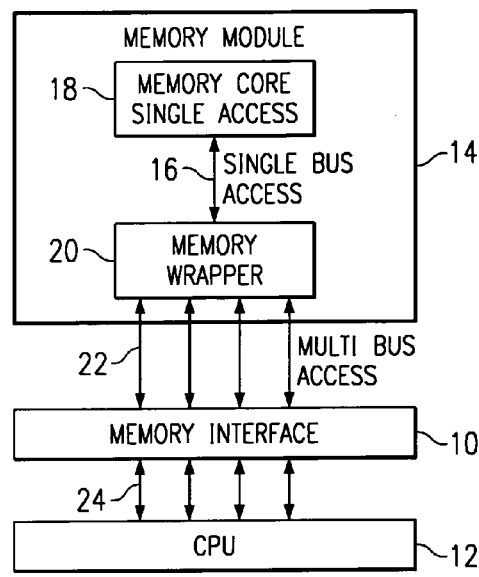
FIG. 1 is a block diagram of a prior art data processing system having a single access memory core.
Figure 2:
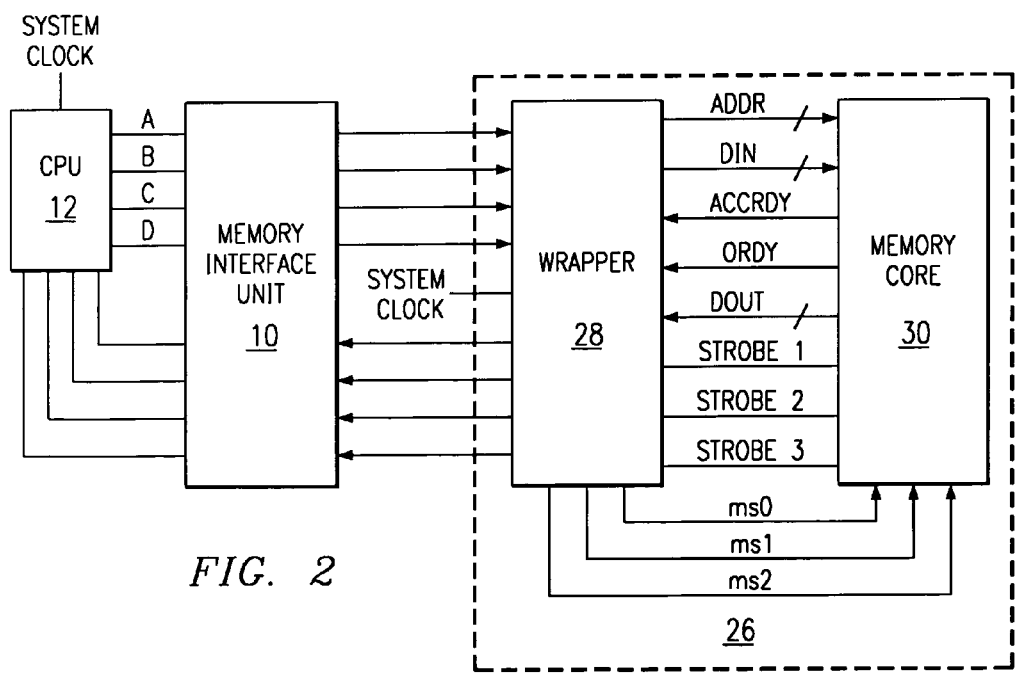
FIG. 2 is a block diagram of a data processing system according to one embodiment of the invention.

An improvement over the single access memory module shown in FIG. 1 is a multi-access memory module, in which several accesses can be performed in one cycle. FIG. 2 illustrates a multi-access memory module 26 according to a preferred embodiment of the invention. A memory interface unit 10 couples a CPU 12 to a multi-access memory module 26. Multi-access memory module 26 comprises a memory wrapper 28 coupling memory interface unit 10 to single-access memory core 30 (in this particular case multi-access memory module is a dual-access RAM). Coupling of memory wrapper 28 to memory core 30 is provided by an address bus (ADDR), a data in bus (d IN), a data out bus (d OUT), a first signal line for an access ready signal (accrdy), a second signal line for an output ready signal (ordy), at least two signal lines for strobe signals (three shown: strobe 1; strobe 2; and strobe 3).

Figure 3:
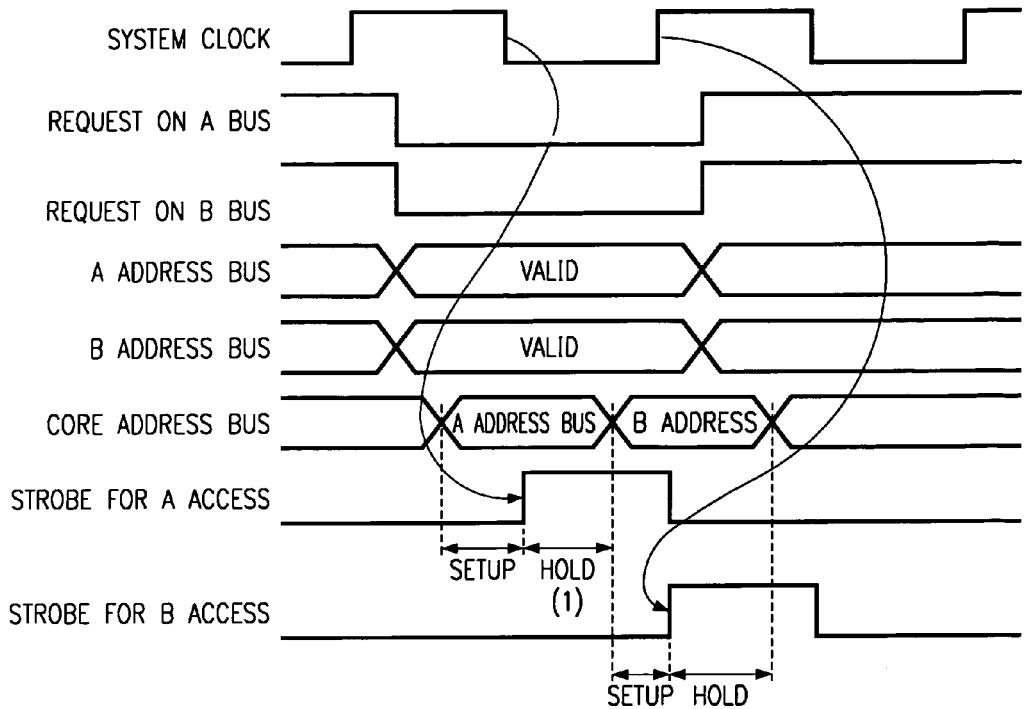
FIG. 3 is is a timing diagram illustrating the signal exchange between the environment, the memory wrapper and the memory core.
Figure 4:
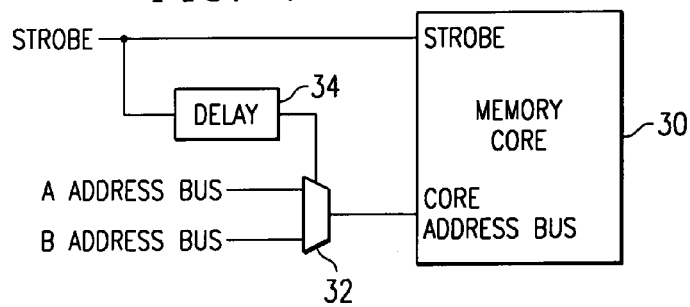
FIG. 4 is a block diagram of a memory core and circuitry for introducing delay or "calibration" between the rising edge of the clock and the control of the mux.

Multi-accessing within a single cycle faces problems not associated with single accessing. One problem is determining how to sequence the accesses in one cycle. Another problem is determining what signal can be used to change the data at the boundary of a multi-access ram memory core. The present invention overcomes both of these problems. FIG. 3 is a timing diagram illustrating the signal exchange between the environment (CPU 12 & memory interface unit 10, the memory wrapper 28 and the memory core 30 in a LEAD 3 Megacell designed and produced by Texas Instruments Incorporated (described in more detail later). In a dual-access environment, there are two accesses to the memory core in one cycle. The memory module is accessed by buses C and D while the addresses of buses A and B are temporarily dispatched to the memory core. As illustrated in FIG. 3 the value on the "A address bus" must be held at the boundary of the core until the hold (1) time is achieved before the "B address bus" is presented to the core. Accordingly, there is a need to switch a mux (not shown) within memory wrapper 28 at the end of the hold time. To attain this result, it is necessary to create a delay between the rising edge of the clock and the control of the mux. FIG. 4 illustrates one technique for creating the desired delay 34, which is also referred to as "calibration". Unfortunately, the approach disclosed in FIG. 4 makes the design synthesizable only with high difficulty because no synthesizer can certify a minimum delay on a path.

Figure 5:
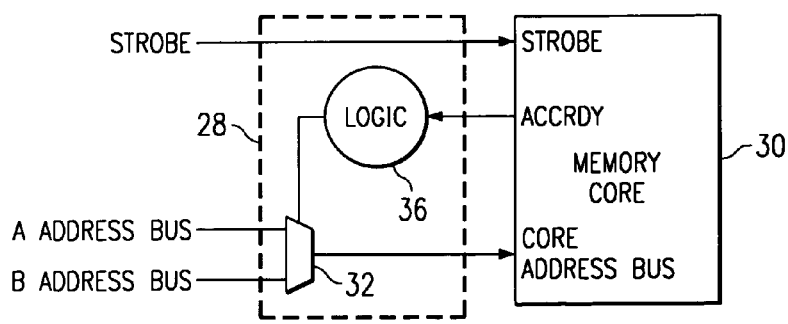
FIG. 5 is a block diagram of a memory core and circuitry for facilitating multiple accesses to a memory core in a single cycle, according to another embodiment of the invention.
Figure 6:
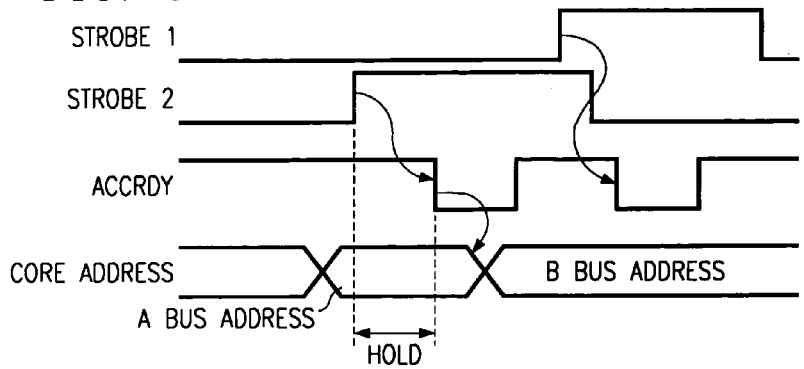
FIG. 6 is a timing diagram illustrating the signal exchange between the environment, the memory wrapper and the memory core, that implements self-timing logic for switching data that must be written into the memory core, according to an embodiment of the invention.

The inclusion of self-timed logic 36 in wrappers, as illustrated in FIG. 5, overcomes the high difficulty aspect of making the design synthesizable. The self-timed logic delivers signals when an action can occur. As an example, the self-timed logic of the memory core 30 can produce a signal (accrdy) to indicate, "the hold time on the address bus is achieved, it is possible to present a new address on the bus". The mux will switch the address bus as soon as the core can accept another address. As a result, there is no need to calibrate anything because the hold time on the core address bus will be given by construction. To be more precise concerning the functioning of the "logic", the mux will switch using "accrdy" if several accesses are linked up and a system clock is used in the case of the first access because "accrdy" has not been generated yet. The A bus address is switched using a system clock while the B address bus is switched using the "accrdy" signal. In a dual-access ram implementation of a memory core, such as Texas Instruments' LEAD 3 Megacell, a multistrobe core is used with strobe 1 being the system clock and strobe 2 being "not system clock", as illustrated in FIG. 6.

Figure 7:
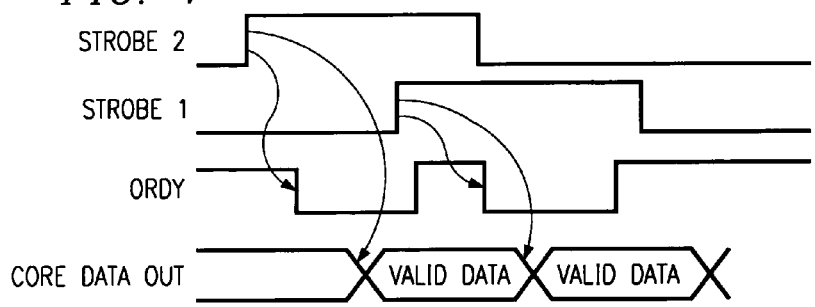
FIG. 7 is a timing diagram illustrating the signal exchange between the environment, the memory wrapper and the memory core, that implements self-timing logic for latching data that are output from the memory core, according to an embodiment of the invention.
Figure 8:
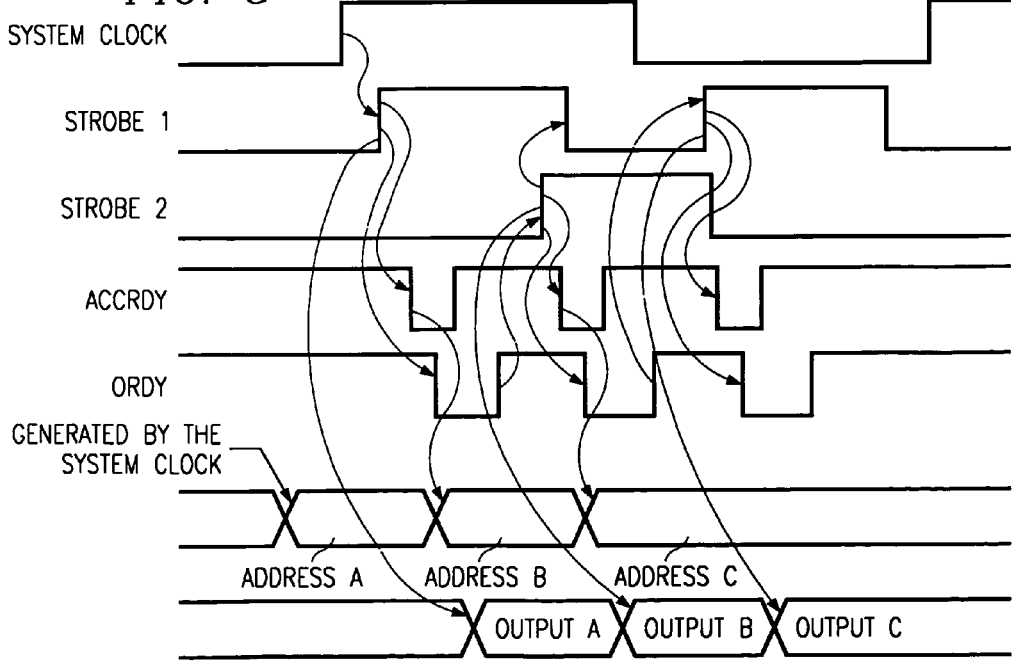
FIG. 8 is is a timing diagram illustrating the signal exchange between the environment, the memory wrapper and the memory core, in an embodiment of the invention that permits triple access to the memory core in one cycle.

In addition to being used for addressing, the self-timing logic is used for switching data that must be written in the memory core. Thus, the same process is used to latch the data that are output from the memory core. As an example, the self-timed signal "ordy" (output ready that is active low) can be used to latch the valid data from the core. In such an implementation, it is not necessary to use the system clock to latch the output data, as illustrated in FIG. 7. Moreover, using the access ready "accrdy" and the output ready "ordy" self-timing signals, it is possible to link up more than 2 access in a single cycle of the clock period if we assume for example that the signification of the rising edge of the "ordy" is the end of the cycle time of the memory. FIG. 8 illustrates the timing diagram of a triple access in one cycle. The system clock initializes the process after which the self-timing logic can link up accesses by itself without the help of the system clock. As a result, the accesses following the access synchronized on the system clock are decorelated from the system clock.

The self-timing architecture of the present invention as applied to memory wrappers avoids calibration problems. Moreover, the self-timing logic of the present invention facilitates the dissociation from the system clock for the access following the access synchronized on the system clock, providing data to the core when needed. A direct application is to make accesses at the speed of the core to process several accesses in one system clock cycle.

The basic architecture of an example of a processor according to the invention will now be described.

FIG. 9 is a schematic overview of a processor 40 (in this particular embodiment a LEAD 3 Megacell manufactured by Texas Instruments Incorporated) incorporating an apparatus for applying self-timing logic to a multi-access memory wrapper in accordance with a preferred embodiment of the present invention. The processor includes a processing engine 42 and a processor backplane 44. In a particular example of the invention, the processor is a Digital Signal Processor implemented in an Application Specific Integrated Circuit (ASIC) which together form a digital signal processor Megacell. As shown in FIG. 9, the processing engine 42 forms a central processing unit (CPU) with a processing core 46 and a memory interface unit 48 for interfacing the processing core 46 with memory units external to the processor core 46.

The processor backplane 44 comprises a backplane bus 50, to which the memory management unit 48 of the processing engine is connected. Also connected to the backplane bus 50 is an instruction cache memory 52, peripheral devices 54 and an external interface 56. It will be appreciated that in other examples, the invention could be implemented using different configurations and/or different technologies. For example, the processing engine 42 could form the processor 40, with the processor backplane 44 being separate therefrom. The processing engine 42 could, for example be a DSP separate from and mounted on a backplane 44 supporting a backplane bus 50, peripheral and external interfaces. The processing engine 42 could, for example, be a microprocessor rather than a DSP and could be implemented in technologies other than ASIC technology. The processing engine or a processor including the processing engine could be implemented in one or more integrated circuits.

FIG. 10 illustrates the basic structure of an embodiment of the processor core 46. As illustrated, this embodiment of processor core 46 includes four element, namely an Instruction Buffer Unit (I Unit) 58 and three execution elements are coupled to multi-access memory 26. The execution units are a Program Flow Unit (P Unit) 60, Address Data Flow Unit (A Unit) 62 and a Data Computation Unit (D Unit) 64 for executing instructions decoded from the Instruction Buffer Unit (I Unit) 58 and for controlling and monitoring program flow.

Figure 11:
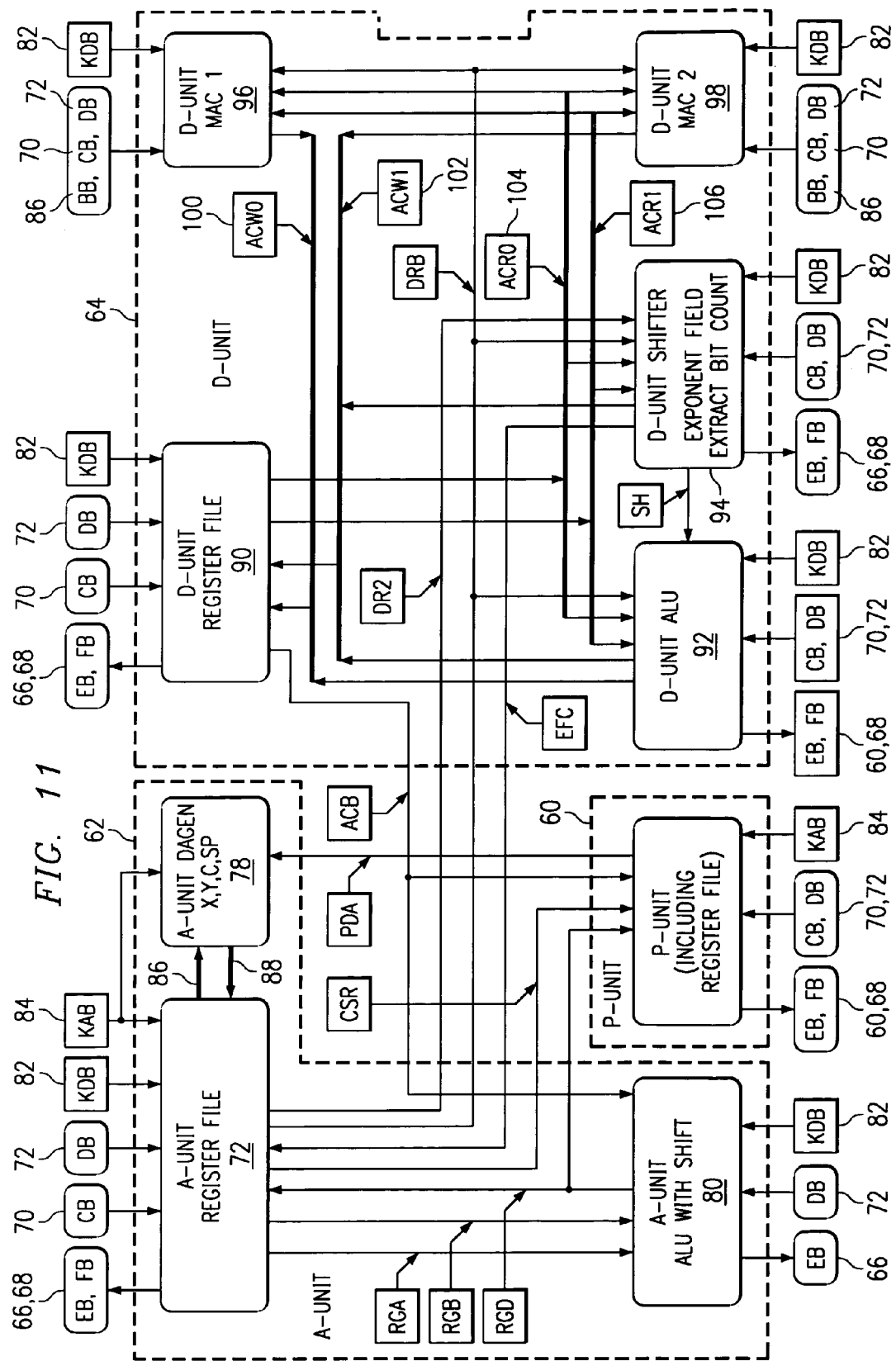
FIG. 11 is a schematic block diagram illustrating a P Unit, A Unit and D Unit of the core processor of FIG. 10.

FIG. 11 illustrates the execution units P Unit 60, A Unit 62 and D Unit 64 of the processing core 46 in more detail and shows the bus structure connecting the various elements of the processing core 46. The P Unit 60 includes, for example, loop control circuitry, GoTo/Branch control circuitry and various registers for controlling and monitoring program flow such as repeat counter registers and interrupt mask, flag or vector registers. The P Unit 60 is coupled to general purpose Data Write busses (EB,FB) 66, 68, Data Read busses (CB,DB) 70, 72 and a coefficient program bus (BB) 74. Additionally, the P Unit 60 is coupled to sub-units within the A Unit 62 and D Unit 64 via various busses such as CSR, ACB and RGD, the description and relevance of which will be discussed hereinafter as and when necessary in relation to particular aspects of embodiments in accordance with the invention.

As illustrated in FIG. 11, in the present embodiment the A Unit 62 includes three sub-units, namely a register file 76, a data address generation sub-unit (DAGEN) 78 and an Arithmetic and Logic Unit (ALU) 80. The A Unit register file 72 includes various registers, among which are 16 bit pointer registers (AR0–AR7) and data registers (DR0–DR3) which may also be used for data flow as well as address generation. Additionally, the register file includes 16 bit circular buffer registers and 7 bit data page registers. As well as the general purpose busses (EB,FB,CB,DB) 66, 68, 70, 72, a coefficient data bus 82 and a coefficient address bus 84 are coupled to the A Unit register file 72. The A Unit register file 72 is coupled to the A Unit DAGEN unit 78 by unidirectional buses 86 and 88 respectively operating in opposite directions. The DAGEN unit 78 includes 16 bit X/Y registers and coefficient and stack pointer registers, for example for controlling and monitoring address generation within the processing engine 42.

The A Unit 62 also comprises a third unit, the ALU 80 which includes a shifter function as well as the functions typically associated with an ALU such as addition, subtraction, and AND, OR and XOR logical operators. The ALU 80 is also coupled to the general purpose buses (EB,DB) 66,72 and an instruction constant data bus (KDB) 82. The A Unit ALU is coupled to the P Unit 60 by a PDA bus for receiving register content from the P Unit 60 register file. The ALU 80 is also coupled to the A Unit register file 72 by busses RGA and RGB for receiving address and data register contents and by a bus RGD for forwarding address and data registers in the register file 72.

In accordance with the illustrated embodiment of the invention D Unit 64 includes five elements, namely a D Unit register file 90, a D Unit ALU 92, a D Unit shifter 94 and two Multiply and Accumulate units (MAC1,MAC2) 96 and 98. The D Unit register file 90, D Unit ALU 92 and D Unit shifter 94 are coupled to buses (EB,FB,CB,DB and KDB) 66, 68, 70, 72 and 82, and the MAC units 96 and 98 are coupled to the buses (CB,DB, KDB) 70, 72, 82, and Data Read bus (BB) 86. The D Unit register file 90 includes 40-bit accumulators (AC0–AC3) and a 16-bit transition register. The D Unit 64 can also utilize the 16 bit pointer and data registers in the A Unit 62 as source or destination registers in addition to the 40-bit accumulators. The D Unit register file 90 receives data from the D Unit ALU 92 and MACs 1&2 96, 98 over accumulator write buses (ACWO, ACWI) 100, 102, and from the D Unit shifter 94 over accumulator write bus (ACW1) 102. Data is read from the D Unit register file accumulators to the D Unit ALU 92, D Unit shifter 94 and MACs 1&2 96, 98 over accumulator read busses (ACR0, ACR1) 104, 106. The D Unit ALU 92 and D Unit shifter 94 are also coupled to sub-units of the A Unit 60 via various buses such as EFC, DRB, DR2 and ACB for example, which will be described as and when necessary hereinafter.

Figure 12:
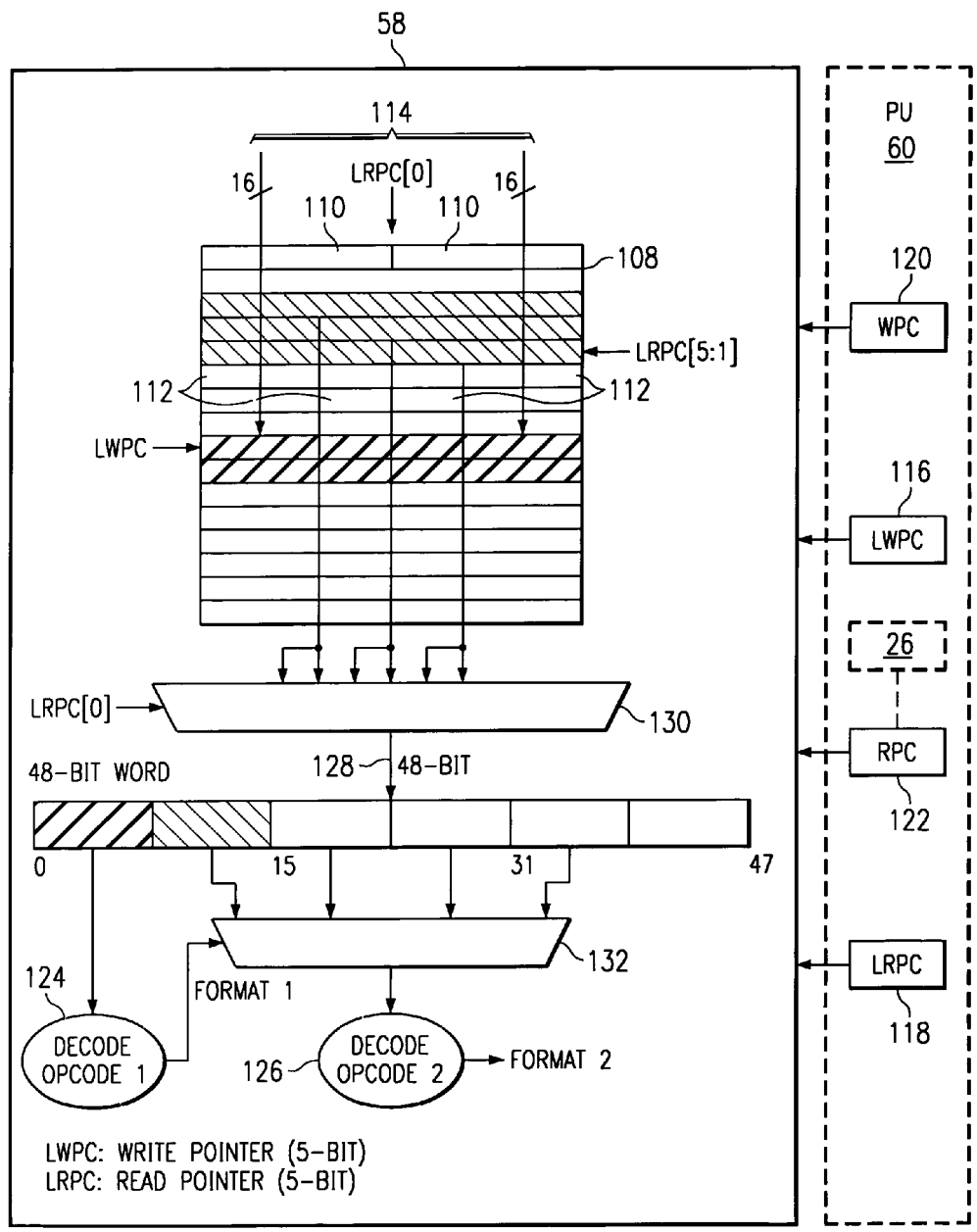
FIG. 12 is a schematic illustration of the operation of an I Unit of the core processor of FIG. 10.

Referring now to FIG. 12, there is illustrated an instruction buffer unit 58 in accordance with the present embodiment of the invention, comprising a 32 word instruction buffer queue (113Q) 108. The IBQ 108 comprises 32×16 bit registers 110, logically divided into 8 bit bytes 112. Instructions arrive at the IBQ 108 via the 32 bit program bus (PB) 114. The instructions are fetched in a 32 bit cycle into the location pointed to by the Local Write Program Counter (LWPC) 116. The LWPC 116 is contained in a register located in the PU 60. The P Unit 60 also includes 20 the Local Read Program Counter (LRPC) 118 register, and the Write Program Counter (WPQ) 120 and Read Program Counter (RPC) 122 registers. LRPC 118 points to the location in the IBQ 108 of the next instruction or instructions to be loaded into the instruction decoder/s 124 and 126. That is to say, the LRPC 114 points to the location in the IBQ 108 of the instruction currently being dispatched to the decoders 124, 126. The WPC points to the address in program memory of the start of the next 4 bytes of instruction code for the pipeline. For each fetch into the IBQ the next 4 bytes from the program memory are fetched regardless of instruction boundaries. The RPC 122 points to the address in program memory of the instruction currently being dispatched to the decoder/s 124/126.

In accordance with this embodiment, the instructions are formed into a 48 bit word and are loaded into the instruction decoders 124, 126 over a 48 bit bus 128 via multiplexors 130 and 132. It will be apparent to a person of ordinary skill in the art that the instructions may be formed into words comprising other than 48-bits, and that the present invention is not to be limited to the specific embodiment described above.

The bus 128 can load a maximum of 2 instructions, one per decoder, during any one instruction cycle. The combination of instructions may be in any combination of formats, 8, 16, 24, 32, 40 and 48 bits, which will fit across the 48 10 bit bus. Decoder 1, 124, is loaded in preference to decoder 2, 126, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries.

The alignment is done based on the format derived for the previous instruction during decode thereof. The multiplexing associated with the alignment of instructions with byte boundaries is performed in multiplexor 130 and 132.

In accordance with a present embodiment the processor core 46 executes instructions through a 7 stage pipeline, the respective stages of which will now be described with reference to FIG. 13.

The first stage of the pipeline is a PRE-FETCH (P0) stage 134, during which stage a next program memory location is addressed by asserting an address on the address bus (PAB) 136 of a memory interface 48.

In the next stage, FETCH (P1) stage 138, the program memory is read and the I Unit 58 is filled via the PB bus 140 from the memory interface unit 48.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 124/126 in the third stage, DECODE (P2) 140, and the instruction decoded and dispatched to the execution unit for executing that instruction, for example the P Unit 60, the A Unit 62 or the D Unit 64. The decode stage 140 includes decoding at least part of an instruction including a first part indicating the class of the instruction, a second part indicating the format of the instruction and a third part indicating an addressing mode for the instruction.

The next stage is an ADDRESS (P3) stage 142, in which the address of the data to be used in the instruction is computed, or a new program address is computed should the instruction require a program branch or jump. Respective computations take place in the A Unit 62 or the P Unit 60 respectively.

In an ACCESS (P4) stage 144 the address of a read operand is generated and the memory operand, the address of which has been generated in a DAGEN Y operator with a Ymem indirect addressing mode, is then READ from indirectly addressed Y memory (Ymem).

The next stage of the pipeline is the READ (P5) stage 148 in which a memory operand, the address of which has been generated in a DAGEN X operator with an Xmem indirect addressing mode or in a DAGEN C operator with coefficient address mode, is READ. The address of the memory location to which the result of the instruction is to be written is generated.

Finally, there is an execution EXEC (P6) stage 150 in which the instruction is executed in either the A Unit 62 or the D Unit 64. The result is then stored in a data register or accumulator, or written to memory for Read/Modify/Write instructions. Additionally, shift operations are performed on data in accumulators during the EXEC stage.

The basic principle of operation for a pipeline processor will now be described with reference to FIG. 13. As can be seen from FIG. 13, for a first instruction 152, the successive pipeline stages take place over time periods $T_1$–$T_7$. Each time period is a clock cycle for the processor machine clock. A second instruction 154, can enter the pipeline in period $T_2$, since the previous instruction has now moved on to the next pipeline stage. For instruction 3, 156, the PREFETCH stage 134 occurs in time period $T_3$. As can be seen from FIG. 13 for a seven stage pipeline a total of 7 instructions may be processed simultaneously. For all 7 instructions 152–164, FIG. 13 shows them all under process in time period $T_7$. Such a structure adds a form of parallelism to the processing of instructions.

Figure 14:
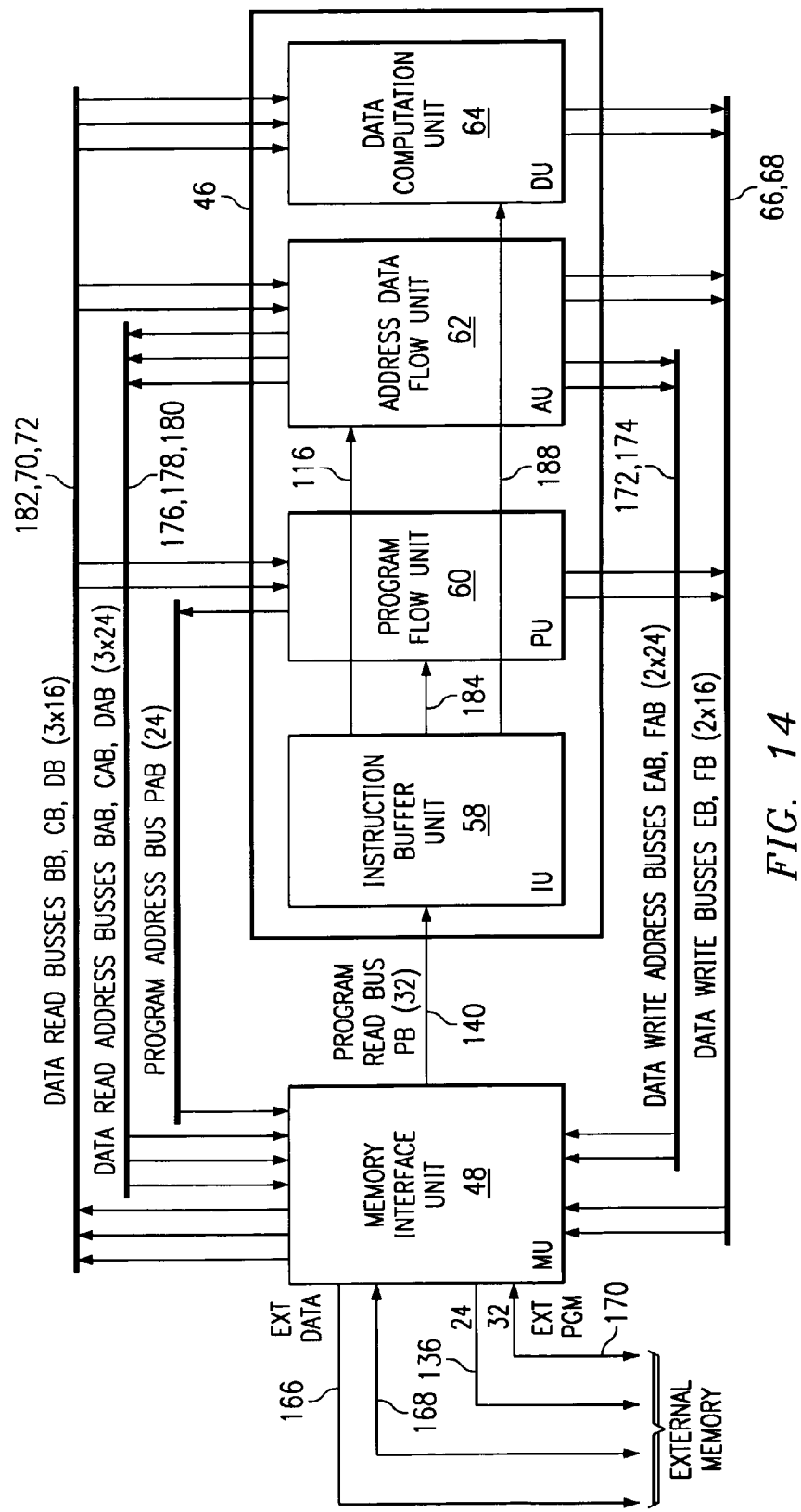
FIG. 14 is a diagrammatic illustration of stateges of a thread through the pipleline of the processor of FIG. 9.

As shown in FIG. 14, the present embodiment of the invention includes a memory interface unit 48 which is coupled to external memory units via a 24 bit address bus 166 and a bi-directional 16 bit data bus 168. Additionally, the memory interface unit 48 is coupled to program storage memory (not shown) via a 24 bit address bus 136 and a 32 bit bidirectional data bus 170. The memory interface unit 48 is also coupled to the I Unit 58 of the machine processor core 46 via a 32 bit program read bus (PB) 140. The P Unit 60, A Unit 62 and D Unit 64 are coupled to the memory interface unit 48 via data read and data write buses and corresponding address busses. The P Unit 60 is further coupled to a program address bus 140.

More particularly, the P Unit 60 is coupled to the memory interface unit 48 by a 24 bit program address bus 140, the two 16 bit data write buses (EB, FB) 66, 68, and the two 16 bit data read buses (CB, DB) 70, 72. The A Unit 62 is coupled to the memory interface unit 48 via two 24 bit data write address buses (EAB, FAB) 172, 174, the two 16 bit data write buses (EB, FB) 66, 68, the three data read address buses (BAB, CAB, DAB) 176, 178, 180 and the two 16 bit data read buses (CB, DB) 70, 72. The D Unit 64 is coupled to the memory interface unit 48 via the two data write buses (EB, FB) 66, 68 and three data read buses (BB, CB, DB) 182, 70, 72.

FIG. 14 represents the passing of instructions from the I Unit 58 to the P Unit 60 at 184, for forwarding branch instructions for example. Additionally, FIG. 14 represents the passing of data from the I Unit 58 to the A Unit 62 and the D Unit 64 at 186 and 188 respectively.

In accordance with a preferred embodiment of the invention, the processing engine is configured to respond to a local repeat instruction which provides for an iterative looping through a set of instructions all of which are contained in the Instruction Buffer Queue 108. The local repeat instruction is a 16 bit instruction and comprises: an op-code; parallel enable bit; and an offset (6 bits).

The op-code defines the instruction as a local instruction, and prompts the processing engine to expect the offset and op-code extension. In the described embodiment the offset has a maximum value of 56, which defines the greatest size of the local loop as 56 bytes of instruction code.

Referring now to FIG. 12, the IQB 108 is 64 bytes long and can store up to 32×16 bit words. Instructions are fetched into IQB 108 2 words at a time. Additionally, the Instruction Decoder Controller reads a packet of up to 6 program code bytes into the instruction decoders 124 and 126 for each Decode stage of the pipeline. The start and end of the loop may fall at any of the byte boundaries within the 4 byte packet of program code fetched to the IQB 108. Thus, the start and end instructions are not necessarily co-terminus with the top and bottom of IQB 108.

For example, in a case where the local loop instruction spans two bytes across the boundary of a packet of 4 program codes, both the packet of 4 program codes must be retained in the IQB 108 for execution of the local loop repeat. In order to take this into account the local loop instruction offset is a maximum of 56 bytes.

When the local loop instruction is decoded the start address for the local loop, i.e., the address after the local instruction address, is stored in the Block Repeat Start AddressØ (RSAØ) register which is located, for example, in the P unit 60. The repeat start address also sets up the Read Program Counter (RPC). The location of the end of the local loop is computed using the offset, and the location is stored in the Block Repeat End Address$_\emptyset$ (REA$_\emptyset$) register, which may also be located in the P unit 608, for example. Two repeat start address registers and two repeat and address registers (RSA$_0$, RSA$_1$, REA$_0$, REA$_1$,) are provided for nested loops. For nesting levels greater that two, preceding start/end addresses are pushed to a stack register.

During the first iteration of a local loop, the program code for the body of the loop is loaded into the IBQ 108 and executed as usual. However, for the following iterations no fetch will occur until the last iteration, during which the fetch will restart.

FIG. 15 illustrates a technique for coupling multiple access memory 26 to memory interface unit 48. Incorporation of the aforementioned self-timing architecture and multiple-access memory wrappers, such as with the processor described above, does away with calibration problems typically encountered when attempting several accesses to a memory core in one clock cycle. The self-timing logic facilitates a full dissociation between environment (what is clocked on the system clock) and the access to the core. Moreover, a direct application facilitates accesses at the speed of the memory core to process several accesses in one system clock cycle.

Optionally, multiple access memory 26 can also be incorporated directly into the processor core, as illustrated in FIG. 16. Placing multiple access memory 26 into the processor core facilitates more intense accessing power savings since the memory wrapper and the additional time required accessing memory interface 48 (via memory interface unit 48), are eliminated.

Figure 17:
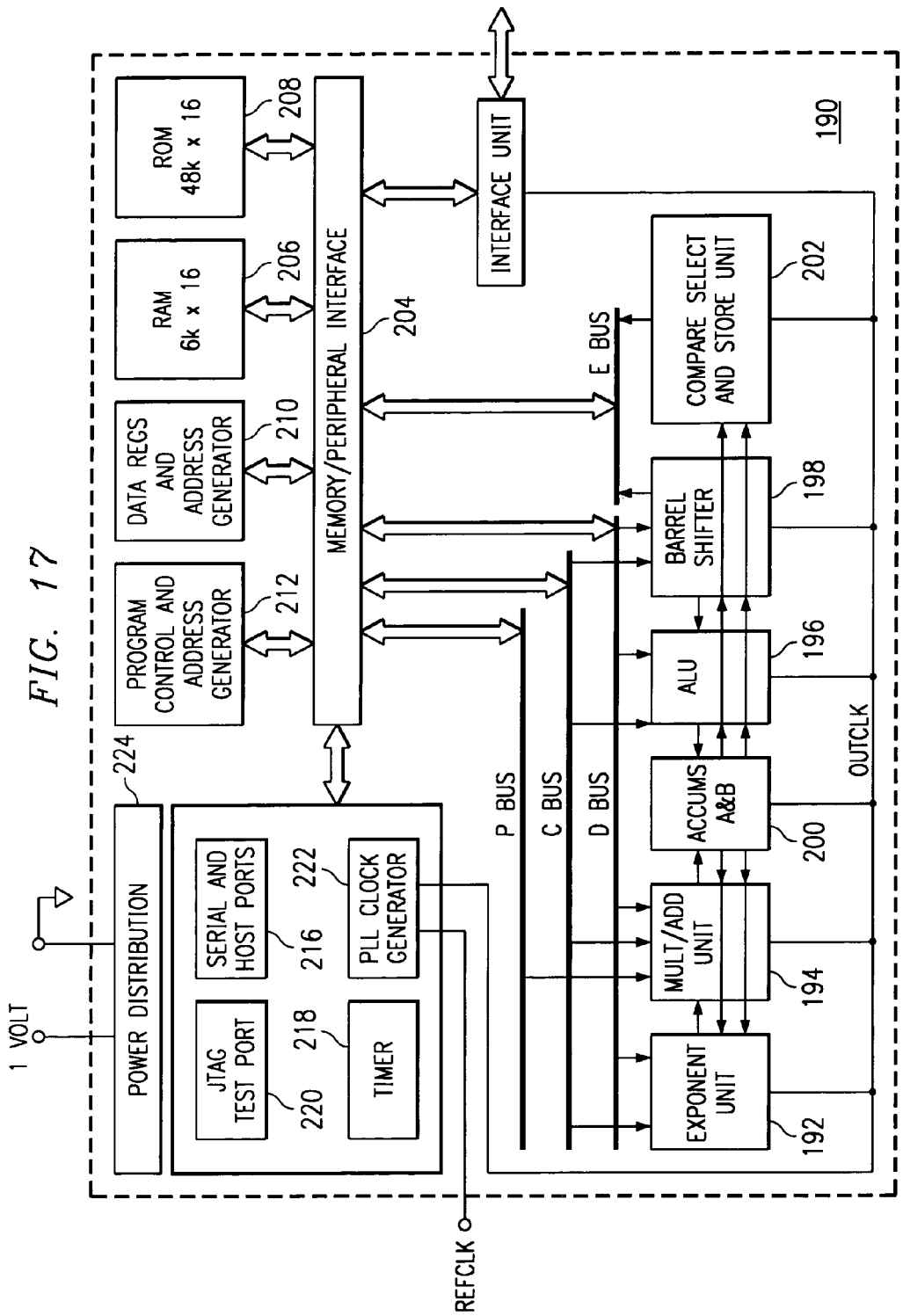
FIG. 17 is a schematic illustration of a digital signal processor (DSP), in which a memory core and circuitry for facilitating multiple accesses to a memory core in a single cycle, according to another embodiment of the invention.

Another example of a VLSI integrated circuit into which memory wrapper 28 and memory core 30 according to the preferred embodiment of the invention may be implemented is illustrated in FIG. 17. The architecture illustrated in FIG. 17 for DSP 190 is presented by way of example, as it will be understood by those of ordinary skill in the art that the present invention may be implemented into integrated circuits of various functionality and architecture, including custom logic circuits, general purpose microprocessors, and other VLSI and larger integrated circuits.

DSP 190 in this example is implemented by way of a modified Harvard architecture, and as such utilizes three separate data buses C, D, E that are in communication with multiple execution units including exponent unit 192, multiply/add unit 194, arithmetic logic unit (ALU) 196, and barrel shifter 198. Accumulators 200 permit operation of multiply/add unit 194 in parallel with ALU 196, allowing simultaneous execution of multiply-accumulate (MAC) and arithmetic operations. The instruction set executable by DSP 190, in this example, includes single-instruction repeat and block repeat operations, block memory move instructions, two and three operand reads, conditional store operations, and parallel load and store operations, as well as dedicated digital signal processing instructions. DSP 190 also includes compare, select, and store unit (CSSU) 202, coupled to data bus E, for accelerating Viterbi computation, as useful in many conventional communication algorithms.

DSP 190 in this example includes significant on-chip memory resources, to which access is controlled by memory/peripheral interface unit 204, via data buses C, D, E, and program bus P. These on-chip memory resources include random access memory (RAM) 206, read-only memory (ROM) 208 used for storage of program instructions, and data registers 210; program controller and address generator circuitry 212 is also in communication with memory/peripheral interface 204, to effect its functions. Interface unit 214 is also provided in connection with memory/peripheral interface to control external communications, as do serial and host ports 216. Additional control functions such as timer 218 and JTAG test port 220 are also included in DSP 190.

According to this preferred embodiment of the invention, the various logic functions executed by DSP 190 are effected in a synchronous manner, according to one or more internal system clocks generated by PLL clock generator 222, constructed as described hereinabove. In this exemplary implementation, PLL clock generator 222 directly or indirectly receives an external clock signal on line REFCLK, such as is generated by other circuitry in the system or by a crystal oscillator or the like, and generates internal system clocks, for example the clock signal on line OUTCLK, communicated (directly or indirectly) to each of the functional components of DSP 190.

DSP 190 also includes power distribution circuitry 224 for receiving and distributing the power supply voltage and reference voltage levels throughout DSP 190 in the conventional manner. As indicated in FIG. 17, DSP 190 according to the preferred embodiment of the present invention may be powered by extremely low power supply voltage levels, such as on the order of 1 volt. This reduced power supply voltage is of course beneficial in maintaining relatively low power dissipation levels, and is in large part enabled by the construction and operation of PLL clock generator 222, which generates stable and accurate internal clock signals even with such low power supply voltages. In this emobodiment of the invention, multiple access memory 26 is part of RAM 206, which means it is included in the processor core. Incorporation of multiple access memory 26 into the processor core facilitates increased accessing of the memory core and power savings since memory wrapper 28 is eliminated and memory interface unit 48 is not used as an interface between the processing engine and the multiple access memory 26.

Referring now to FIG. 18, an example of an electronic computing system constructed according to the preferred embodiment of the present invention will now be described in detail. Specifically, FIG. 18 illustrates the construction of a wireless communications system, namely a digital cellular telephone handset 200 constructed according to the preferred embodiment of the invention. It is contemplated, of course, that many other types of communications systems and computer systems may also benefit from the present invention, particularly those relying on battery power. Examples of such other computer systems include personal digital assistants (PDAs), portable computers, and the like. As power dissipation is also of concern in desktop and line-powered computer systems and microcontroller applications, particularly from a reliability standpoint, it is also contemplated that the present invention may also provide benefits to such line-powered systems.

Handset 226 includes microphone M for receiving audio input, and speaker S for outputting audible output, in the conventional manner. Microphone M and speaker S are connected to audio interface 228 which, in this example, converts received signals into digital form and vice versa. In this example, audio input received at microphone M is processed by filter 230 and analog-to-digital converter (ADC) 232. On the output side, digital signals are processed by digital-to-analog converter (DAC) 234 and filter 236, with the results applied to amplifier 238 for output at speaker S.

The output of ADC 232 and the input of DAC 234 in audio interface 228 are in communication with digital interface 240. Digital interface 240 is connected to microcontroller 242 and to digital signal processor (DSP) 190 (alternatively, DSP 40 of FIG. 9 could also be used in lieu of DSP 190), constructed as described hereinabove relative to FIG. 15, by way of separate buses in the example of FIG. 16.

Microcontroller 242 controls the general operation of handset 226 in response to input/output devices 244, examples of which include a keypad or keyboard, a user display, and add-on cards such as a SIM card. Microcontroller 242 also manages other functions such as connection, radio resources, power source monitoring, and the like. In this regard, circuitry used in general operation of handset 226, such as voltage regulators, power sources, operational amplifiers, clock and timing circuitry, switches and the like are not illustrated in FIF. 16 for clarity; it is contemplated that those of ordinary skill in the art will readily understand the architecture of handset 226 from this description.

In handset 226 according to the preferred embodiment of the invention, DSP 190 is connected on one side to interface 240 for communication of signals to and from audio interface 228 (and thus microphone M and speaker S), and on another side to radio frequency (RF) circuitry 246, which transmits and receives radio signals via antenna A. Conventional signal processing performed by DSP 190 may include speech coding and decoding, error correction, channel coding and decoding, equalization, demodulation, encryption, voice dialing, echo cancellation, and other similar functions to be performed by handset 190.

RF circuitry 246 bidirectionally communicates signals between antenna A and DSP 190. For transmission, RF circuitry 246 includes codec 248 which codes the digital signals into the appropriate form for application to modulator 250. Modulator 250, in combination with synthesizer circuitry (not shown), generates modulated signals corresponding to the coded digital audio signals; driver 252 amplifies the modulated signals and transmits the same via antenna A. Receipt of signals from antenna A is effected by receiver 254, which applies the received signals to codec 248 for decoding into digital form, application to DSP 190, and eventual communication, via audio interface 228, to speaker S.

The scope of the present disclosure includes any novel feature or combination of features disclosed therein either explicitly or implicitly or any generalization thereof irrespective of whether or not it relates to the claimed invention or mitigates any or all of the problems addressed by the present invention. The applicant hereby gives notice that new claims may be formulated to such features during the prosecution of this application or of any such further application derived therefrom. In particular, with reference to the appended claims, features from dependant claims may be combined with those of the independent claims in any appropriate manner and not merely in the specific combinations enumerated in the claims.

What is claimed is:

1. An electronic system, comprising:
   at least one input/output device; and
   an integrated circuit, coupled to the at least one input/output device, and comprising
      functional circuitry for executing logical operations upon digital data signals in a synchronous fashion; and
      access circuitry coupled to said functional circuitry and further coupled to a memory core in said integrated circuit for asynchronously accessing said memory core more than once in a single clock cycle.

2. The electronic system of claim 1, wherein said electronic system is a cellular telephone.

3. The electronic system of claim 1, wherein said memory core is part of a dual-access RAM.

4. The electronic system of claim 1, wherein said memory core and said access circuitry combine to form a multiple access memory core.

5. The electronic system of claim 1, wherein said access circuitry is embodied in an electronic device coupling a memory interface unit to said memory core.

6. The electronic system of claim 1, wherein said electronic system is a digital signal processor.

7. The electronic system of claim 1, wherein said memory core is part of a core of a processor.

8. The electronic system of claim 1, wherein addresses accessed in said memory core are adjacent addresses.

9. The electronic system of claim 1, wherein addresses accessed in said memory core are non-adjacent addresses.

10. An electronic system, comprising:
    at least one input/output device; and
    an integrated circuit, coupled to the at least one input/output device, and comprising:
       functional circuitry for executing logical operations upon digital data signals in a synchronous fashion; and
       access circuitry coupled to a memory core in said integrated circuit for accessing said memory core more than once in a single clock cycle wherein self-timing logic provides signals that facilitate said accessing.

11. The electronic system of claim 10, wherein said electronic system is a cellular telephone.

12. The electronic system of claim 10, wherein said memory core is part of a dual-access RAM.

13. The electronic system of claim 10, wherein said memory core and said access circuitry combine to form a multiple access memory core.

14. The electronic system of claim 10, wherein said access circuitry is embodied in an electronic device coupling a memory interface unit to said memory core.

15. The electronic system of claim 10, wherein said electronic system is a digital signal processor.

16. The electronic system of claim 10, wherein said memory core is part of a core of a processor.

17. The electronic system of claim 10, wherein addresses accessed in said memory core are adjacent addresses.

18. The electronic system of claim 10, wherein address accessed in said memory core are non-adjacent addresses.

19. A memory module, comprising:
    a memory interface unit;
    a memory core; and
    circuitry for coupling said memory interface unit to said memory core and enabling access to said memory core at least two times in a single clock cycle.

20. The memory module of claim 19, wherein addresses accessed in said memory core are adjacent addresses.

21. The memory module system of claim 19, wherein address accessed in said memory core are non-adjacent addresses.

22. The memory module of claim 19, wherein said circuitry is in other than said memory interface unit.

23. A memory module, comprising:
a memory interface unit;
a memory core; and
circuitry for coupling said memory interface unit to said memory core and enabling access to said memory core at least two times in a single clock cycle, said circuitry comprising a multiplexer having a first input coupled to a first address bus, a second input coupled to receive a second address bus, an output coupled to an input of said memory core and logic circuitry having an input coupled to receive an output signal from said memory core and an output coupled to an input of said multiplexer.

24. The memory module of claim 23, wherein an output signal from said memory core is a signal that indicates that a hold time on one of said first and second address busses is achieved.

25. The memory module of claim 23, wherein an output signal from said memory core is a signal that indicates that a hold time on one of said first and second address busses is achieved and that it is possible to present a new address on the bus.

26. The memory module of claim 23, wherein said logic circuitry is self-timing.

27. The memory module of claim 26, wherein said self-timing logic circuitry is used for addressing and for switching data that must be written in said memory core.

28. The memory module of claim 26, wherein said self-timing logic circuitry facilitates a dissociation between what is clocked on a system clock and access to the memory core.

29. A memory module, comprising:
a memory interface unit;
a single-access memory core; and
circuitry for coupling said memory interface unit to said memory core and enabling access to said memory core at least two times in a single clock cycle.

30. A memory module, comprising:
a memory interface unit;
a memory core; and
circuitry for coupling said memory interface unit to said memory core and enabling access to said memory core at least two times in a single clock cycle, said circuitry comprising a multiplexer having a first input coupled to a first address bus, a second input coupled to receive a second address bus, an output coupled to an input of said memory core and delay circuitry having an input coupled to receive a signal for input to said memory core and an output coupled to an input of said multiplexer.

31. The memory module of claim 30, wherein said signal for input to said memory core is a strobe signal.

32. A memory module, comprising:
a memory interface unit;
a memory core; and
circuitry for coupling said memory interface unit to said memory core and enabling access to said memory core at least two times in a single clock cycle, wherein an address bus, a data in bus, a data out bus, a first signal line for an access ready signal, a second signal line for an output ready signal, and at least two signal lines for strobe signals couple said circuitry to said memory core.

33. A memory module, comprising:
a memory interface unit;
a memory core; and
circuitry for coupling said memory interface unit to said memory core and enabling access to said memory core at least two times in a single clock cycle, wherein a memory module is accessed by a first bus and a second bus while addresses of a third bus and a fourth bus are temporarily dispatched to said memory core.

34. A memory module, comprising:
a memory interface unit;
a memory core; and
circuitry for coupling said memory interface unit to said memory core and enabling access to said memory core at least two times in a single clock cycle, wherein a first bus address is switched using a signal from a system clock while a second address bus is switched using a signal other than from said system clock.

35. A processing apparatus, comprising:
a processing engine; and
a processor backplane coupled to said processing engine, said processor backplane comprising a memory module, said memory module, comprising:
a memory interface unit;
a memory core; and
circuitry for coupling said memory interface unit to said memory core and enabling access to said memory core at least two times in a single clock cycle.

36. The processor backplane of claim 35, wherein a bus couples said memory module to said processing engine.

37. The processing apparatus of claim 35, wherein said processor backplane further comprises a memory cache coupled to said processing engine.

38. The processing apparatus of claim 35, wherein said processor backplane further comprises at least one peripheral device coupled to said processing engine.

39. The processing apparatus of claim 35, wherein said processor backplane further comprises an external interface coupled to said processing engine.

40. The processing apparatus of claim 35, wherein said processing engine comprises a processing core coupled to a memory management unit.

41. The processing apparatus of claim 40, wherein said processing core is a central processing unit.

42. The processing apparatus of claim 40, wherein said processing core comprises:
an instruction buffer unit;
a program flow unit;
an address data flow unit; and
a data computation unit coupled to said instruction buffer unit, said program flow unit and said address flow unit.

43. The processing apparatus system of claim 35, wherein addresses accessed in said memory core are adjacent addresses.

44. The processing apparatus of claim 35, wherein addresses accessed in said memory core are non-adjacent addresses.

45. The processing apparatus of claim 35, wherein said circuitry is in other than said memory interface unit.

* * * * *